Patented Jan. 21, 1930

1,744,163

UNITED STATES PATENT OFFICE

ERNST HONOLD, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

VAT DYESTUFF AND PROCESS OF MAKING SAME

No Drawing. Application filed September 26, 1927, Serial No. 222,213, and in Germany October 2, 1926.

I have found that by treating with an alkaline condensing agent a benzanthrone compound containing one or more arylsulfamino- (aryl-$SO_2$-NH-) groups in its molecule valuable vat dyestuffs are obtainable belonging to the dibenzanthrone or isodibenzanthrone series or representing mixtures of both types. In consequence of the solubility in alkalis of the aryl-$SO_2$-NH-groups containing starting materials the condensation process runs particularly smoothly.

My invention is based on the surprising fact that in the course of the alkaline fusion the behaviour of the arylsulfamino-groups is different according to their positions in the benzanthrone molecule: The aryl-sulfaminogroups standing in 2- or Bz-1-positions are split up in the course of the reaction, whereas the arylsulfaminogroups standing in other than the aforesaid positions remain unattacked by the reacting agent and are still present in the molecule of the reaction products. These latter arylsulfaminogroups can be transformed into aminogroups by treating the reaction products with acid saponifying agents, particularly with sulfuric acid. The dyestuffs thus obtained contain free aminogroups in their molecule, they differ essentially from the dyestuffs obtainable by condensing with alkaline acting agents the corresponding aminobenzanthrones themselves (probably the aminogroup being attacked by the alkali applied in such a condensation).

The benzanthrone compounds suitable for my process may contain besides the arylsulfaminogroups further substituents, they correspond to the general formula:

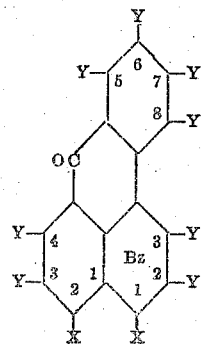

in which formula X means hydrogen or a substituent separating by the reaction and the Y's represent hydrogen atoms, of which one or more may be replaced by a nonreactive monovalent substituent, at least one X or Y standing for a group —NH-$SO_2$-aryl. As such substituents in the X-positions separating by the reaction besides the —NH-$SO_2$-aryl-groups, halogens, mercaptane-, sulfide-, thioether- and the sulfinic-groups are named, as nonreactive substituents in the Y-positions besides the —NH-$SO_2$-aryl-groups halogens, alkyl-, alkoxy-, hydroxy, and thioether- and amino-groups.

As alkaline condensing agents there may be used a caustic alkali in aqueous or alcoholic solution or with the addition of aniline, sodiumaniline, sodiumethylate or a similar acting agent.

The vat dyestuffs thus obtained are when dry bluish to grey to black powders, soluble in concentrated sulfuric acid with a greenish to olive to black color, they dye cotton from a bluish to violet vat bluish to grey to black shades of an excellent fastness.

The new one or more —NH-$SO_2$-aryl-groups containing derivatives of benzanthrone used as starting materials for my process may be obtained either by treating the corresponding aminoderivatives with an arylsulfochloride or by condensing the corresponding halogenated derivatives with an arylsulfamide, advantageously with addition of an agent neutralizing the acid set free and of a catalyst in presence of a suitable diluent.

In order to further illustrate my invention the following examples are given, the parts being by weight and all temperatures in centigrade degrees, but it is understood, that my invention is not limited to the particular products or reacting conditions mentioned therein.

Example 1

At about 160° (temperature of the bath) 10 parts of Bz-1-paratoluenesulfaminobenzanthrone are introduced into a molten mixture of 50 parts of caustic potash and 5 parts of alcohol.

The benzanthrone compound is immediately dissolved and the molten mass turns to a dark red coloration. After having increased the temperature of the bath for about an hour to about 210°, the mass is diluted with water and the leuco-compound of the dyestuff formed oxidized by introducing a current of air or by means of other oxidizing agents. The dyestuff isolated in the usual manner is soluble in concentrated sulfuric acid with a green color, it dyes cotton from a bluish violet vat reddish blue shades.

It corresponds probably to the following formula:

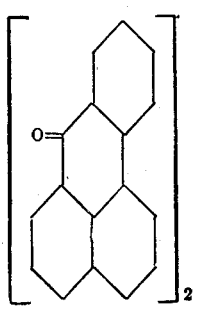

The Bz-1-paratoluenesulfaminobenzanthrone used for the process of the formula:

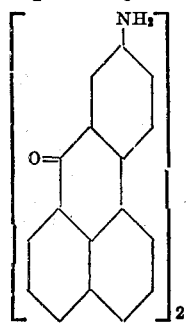

may be prepared either by treating Bz-1-aminobenzanthrone with paratoluenesulfochloride or by condensing Bz-1-halogenobenzanthrone with paratoluenesulfamide (advantageously by boiling it in nitrobenzene solution with addition of a catalyst and an agent neutralizing the acid set free). The Bz-1-paratoluene-sulfamino-benzanthrone is soluble in dilute caustic soda solution with a dark red color, in concentrated sulfuric acid with a dark red color and an orange yellow fluorescence, the coloration turning to brownish yellow after standing for a short time.

*Example 2*

At about 170° (temperature of the bath) 20 parts of 6-Bz-1-diparatoluenesulfaminobenzanthrone are introduced into a molten mixture of 100 parts of caustic alkali and 10 parts of alcohol and the temperature of the bluish violet colored mass is increased to about 220° during one hour. When the formation of dyestuff is finished the mass is poured on water and the leuco-compound contained in the solution is oxidized in the usual manner. The new condensation product thus obtained separates partly as potassium salt, it is precipitated by acidification and filtered. It is soluble in dilute caustic alkali solutions with a brownish violet color and forms with hydrosulfite and alkali a bluish violet vat, from which cotton is only feebly dyed.

In order to saponify the product of condensation it is dissolved in the tenfold amount of concentrated sulfuric acid and the solution is stirred for about an hour at about 120°. By precipitating it with water the new dyestuff, containing the free aminogroups and being insoluble in alkalis is isolated.

It corresponds probably to the formula:

$$\begin{bmatrix} \text{structure} \end{bmatrix}_2$$

It dissolves in concentrated sulfuric acid with an olive black color, it forms with hydrosulfite and alkalis a bluish violet vat dyeing cotton therefrom grey to black shades of an excellent fastness.

Instead of caustic alkalis in presence of alcohol other alkaline condensing agents may be used for the process, such as for instance caustic alkalis with addition of aniline, sodiumaniline and sodiumethylate. A dyestuff of analogous properties is obtained by treating with alkaline condensing agents the 6-paratoluenesulfaminobenzanthrone, the Bz-1-position of which is substituted by an S-containing group such as —SCH$_3$, —S—, SO$_2$H.

The 6-Bz-1-di-paratoluenesulfaminobenzanthrone used for the process of the formula:

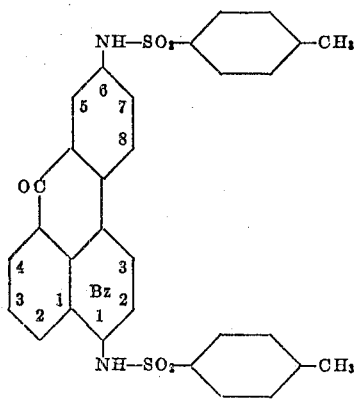

may be prepared in the aforesaid manner for instance either by heating 6-Bz-1-diaminobenzanthrone with paratoluenesulfochlorid with addition of carbonate of soda or chalk or by acting with paratoluenesulfamide on 6-Bz-1-dihalogenobenzanthrone. The 6-Bz-1-diparatoluenesulfaminobenzanthrone is soluble in dilute caustic soda solution with a violet color and in concentrated sulfuric acid with a dark red color.

When replacing it by the equivalent amount of 6-para-toluenesulfamino-Bz-1-chlorobenzanthrone and working otherwise as described above a dyestuff of the same kind is obtained, by using Bz-2-benzenesulfaminobenzanthrone and saponifying the benzenesulfaminogroups contained in the molecule of the condensation product to aminogroups a dyestuff is formed, insoluble in caustic alkali solutions, soluble in concentrated sulfuric acid with a violet black color; it forms with an alkaline hydrosulfite solution a bluish vat, from which cotton is dyed greenish grey shades of an excellent fastness.

I claim:

1. The process which comprises treating with an alkaline condensing agent a benzanthrone compound of the general formula:

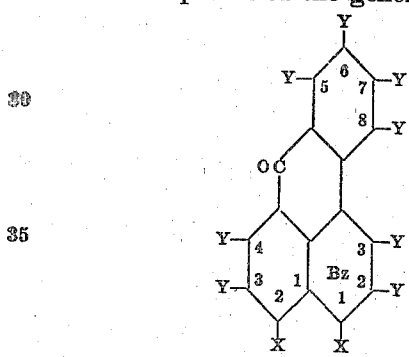

in which formula X means hydrogen or a substituent of the group including arylsulfamino, halogen, mercaptane, sulfide, thioether, and sulfinic acid and the Y's represent hydrogen atoms, of which one or more may be replaced by a monovalent substituent, at least one X or Y standing for a group —NH-SO$_2$-aryl.

2. The process which comprises treating with an alkaline condensing agent a benzanthrone compound of the general formula:

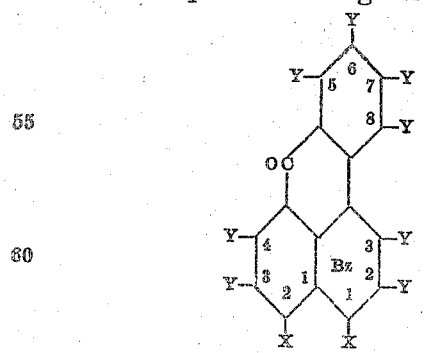

in which formula X means hydrogen or a substituent of the group including arylsulfamino, halogen, mercaptane, sulfide, thioether, and sulfinic acid and the Y's represent hydrogen atoms, of which one or more may be replaced by a monovalent substituent, at least one Y standing for a group —NH-SO$_2$-aryl.

3. The process which comprises treating with an alkaline condensing agent a benzanthrone compound of the general formula:

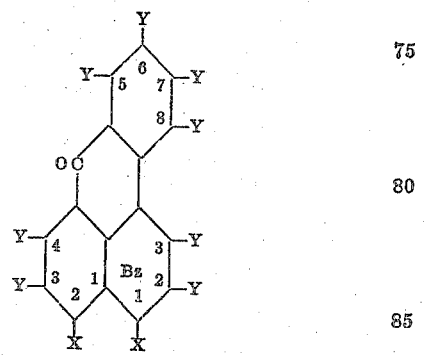

in which formula X means hydrogen or a substituent of the group including arylsulfamino, halogen, mercaptane, sulfide, thioether, and sulfinic acid and the Y's represent hydrogen atoms, of which one or more may be replaced by a monovalent substituent, at least one Y standing for a group —NH-SO$_2$-aryl, and treating the products of condensation thus obtained with acid saponifying agents for saponifying the arylsulfaminogroups still contained to aminogroups.

4. As new compounds the vat dyestuffs, being when dry grey to black powders, soluble in concentrated sulfuric acid with a greenish to olive to black color, forming with an alkaline hydrosulfite solution a bluish vat and dyeing cotton therefrom grey to black shades of an excellent fastness and being substantially identical with products, obtainable by treating with alkaline condensing agents a benzanthrone compound of the general formula:

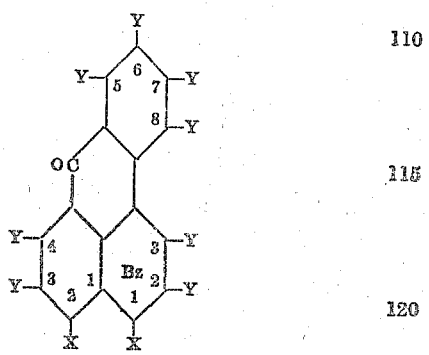

in which formula X means hydrogen or a substituent of the group including arylsulfamino, halogen, mercaptane, sulfide, thioether, and sulfinic acid and the Y's represent hydrogen atoms of which one or more may be replaced by a monovalent substituent, at least one Y standing for a group —NH-SO$_2$-aryl, and by treating the products of condensation thus obtained with acid saponifying agents for saponifying the arylsulfaminogroups still contained to aminogroups.

5. As a new compound the vat dyestuff, being when dry a blackish powder, soluble in concentrated sulfuric acid with an olive black color, forming with an alkaline hydrosulfite solution a bluish violet vat and dyeing cotton therefrom grey-black shades of an excellent fastness, and being substantially identical with a product obtainable by treating with an alkaline condensing agent a benzanthrone compound of the formula:

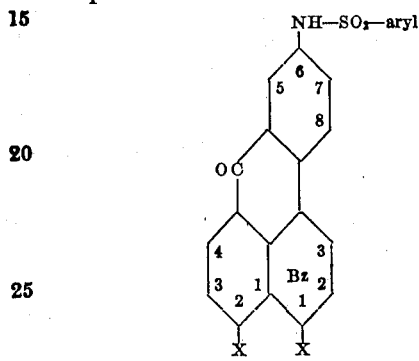

in which formula X means hydrogen or a substituent of the group including arylsulfamino, halogen, mercaptane, sulfide, thioether, and sulfinic acid, and treating the product of condensation thus obtained with acid saponifying agents for saponifying the arylsulfaminogroups to aminogroups.

6. The process which comprises introducing about 10 parts of a compound of the general formula:

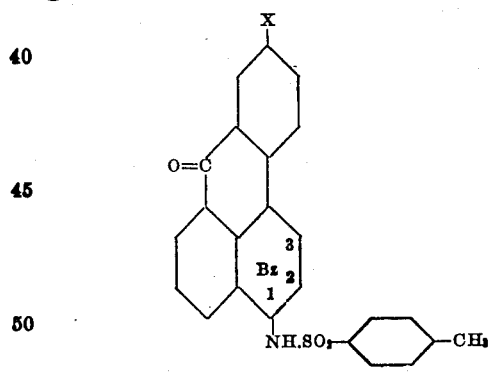

wherein X represents hydrogen or the paratoluenesulfamino group, into a molten mixture of about 50 parts of caustic alkali and about 5 parts of alcohol, heating the reaction mixture to a temperature of from about 210° to about 220° C. for about one hour, and isolating the dyestuff in the usual manner.

In testimony whereof, I affix my signature.

ERNST HONOLD.